(12) United States Patent
Yamamoto

(10) Patent No.: US 10,189,454 B2
(45) Date of Patent: Jan. 29, 2019

(54) BRAKE SYSTEM

(71) Applicant: TOYOTA JIDOSHA KABUSHIKI KAISHA, Toyota-shi, Aichi-ken (JP)

(72) Inventor: Naoki Yamamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/381,934

(22) Filed: Dec. 16, 2016

(65) Prior Publication Data
US 2017/0232945 A1 Aug. 17, 2017

(30) Foreign Application Priority Data

Feb. 16, 2016 (JP) .................................. 2016-026517

(51) Int. Cl.
*B60L 7/26* (2006.01)
*B60T 7/04* (2006.01)
(Continued)

(52) U.S. Cl.
CPC ............... *B60T 8/26* (2013.01); *B60L 7/26* (2013.01); *B60L 11/14* (2013.01);
(Continued)

(58) Field of Classification Search
CPC . B60T 8/26; B60T 7/042; B60T 8/172; B60T 8/171; B60T 13/146; B60T 13/686; B60T 13/741; B60T 2270/608; B60T 13/586; B60T 8/267; B60T 2270/604; B60L 15/2009; B60L 7/26; B60L 11/14;
(Continued)

(56) References Cited

U.S. PATENT DOCUMENTS

| 5,615,933 A | 4/1997 | Kidston et al. |
| 6,439,674 B1 * | 8/2002 | Niino .......................... 303/152 |

(Continued)

FOREIGN PATENT DOCUMENTS

| DE | 100 10 735 A1 | 1/2001 |
| DE | 10 2012 216590 A1 | 3/2014 |

(Continued)

OTHER PUBLICATIONS

May 30, 2018 Office Action issued in U.S. Appl. No. 15/382,060.

*Primary Examiner* — Pamela Rodriguez
(74) *Attorney, Agent, or Firm* — Oliff PLC

(57) ABSTRACT

A brake system for a vehicle, including: a brake operation member; a hydraulic brake device configured to give a braking force based on an operation of the brake operation member; an electric brake device configured to give a braking force generated by an electric actuator; a regenerative brake device configured to give a braking force utilizing electric power generation by rotation of a wheel, and a controller configured to determine insufficient braking force by excluding the braking force by the hydraulic brake device from a required overall braking force required for the vehicle as a whole and to control the braking force by each of the electric brake device and the regenerative brake device based on the insufficient braking force, wherein the brake system is configured such that the hydraulic brake device gives the braking force when the required overall braking force exceeds a threshold.

13 Claims, 8 Drawing Sheets

(51) Int. Cl.

| | | |
|---|---|---|
| *B60T 8/26* | (2006.01) | |
| *B60L 11/14* | (2006.01) | |
| *B60L 15/20* | (2006.01) | |
| *B60T 13/14* | (2006.01) | |
| *B60T 13/58* | (2006.01) | |
| *B60T 13/68* | (2006.01) | |
| *B60T 13/74* | (2006.01) | |
| *B60T 8/171* | (2006.01) | |
| *B60T 8/172* | (2006.01) | |

(52) U.S. Cl.
CPC .......... *B60L 15/2009* (2013.01); *B60T 7/042* (2013.01); *B60T 8/171* (2013.01); *B60T 8/172* (2013.01); *B60T 13/146* (2013.01); *B60T 13/586* (2013.01); *B60T 13/686* (2013.01); *B60T 13/741* (2013.01); *B60T 8/267* (2013.01); *B60T 2270/604* (2013.01); *B60T 2270/608* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
CPC ............... Y02T 10/1077; Y02T 10/645; Y02T 10/7275; Y02T 10/70; Y02T 10/72
USPC ...... 303/3, 15, 115.2, 151, 155, 113.1–113.4, 303/152; 701/70, 71, 78
See application file for complete search history.

(56) References Cited

U.S. PATENT DOCUMENTS

| | | | |
|---|---|---|---|
| 8,366,210 B2 * | 2/2013 | Maki et al. ................ 303/151 | |
| 2004/0090116 A1 | 5/2004 | Tsunehara | |
| 2004/0108771 A1 | 6/2004 | Tsunehara | |
| 2005/0143878 A1 | 6/2005 | Park et al. | |
| 2007/0114844 A1 | 5/2007 | Maki et al. | |
| 2009/0069149 A1 | 3/2009 | Okumura et al. | |
| 2010/0030444 A1 | 2/2010 | Roll et al. | |
| 2010/0198475 A1 | 8/2010 | Stolzl et al. | |
| 2011/0168502 A1 | 7/2011 | Linhoff et al. | |
| 2011/0210604 A1 | 9/2011 | Yamamoto et al. | |
| 2011/0313039 A1 | 12/2011 | Destaillats et al. | |
| 2013/0207451 A1 | 8/2013 | Ohkubo et al. | |
| 2014/0131150 A1 | 5/2014 | Nimura et al. | |
| 2015/0115697 A1 | 4/2015 | Yamamoto et al. | |
| 2015/0197230 A1 | 7/2015 | Kolarsky et al. | |
| 2015/0203086 A1 | 7/2015 | Miyazaki | |

FOREIGN PATENT DOCUMENTS

| | | |
|---|---|---|
| EP | 1 428 738 A2 | 6/2004 |
| EP | 2481649 A1 | 8/2012 |
| JP | 2001-263395 A | 9/2001 |
| JP | 2002-067909 A | 3/2002 |
| JP | 2004-155390 A | 6/2004 |
| JP | 2004189056 A | 7/2004 |
| JP | 2004-338582 A | 12/2004 |
| JP | 2007-137258 A | 6/2007 |
| JP | 2008-265397 A | 11/2008 |
| JP | 2012-519199 A | 8/2012 |
| JP | 5114575 B2 | 1/2013 |
| JP | 2014-136441 A | 7/2014 |
| JP | 2015-139293 A | 7/2015 |
| KR | 2015123358 A | 11/2015 |
| WO | 2011/036719 A1 | 3/2011 |
| WO | 2013/008298 A1 | 1/2013 |

* cited by examiner

BRAKE SYSTEM

CROSS REFERENCE TO RELATED APPLICATION

The present application claims priority from Japanese Patent Application No. 2016-026517, which was filed on Feb. 16, 2016, the disclosure of which is herein incorporated by reference in its entirety.

BACKGROUND

Technical Field

The following disclosure relates to a brake system installed on vehicles and more particularly to a brake system including a regenerative brake device.

Description of Related Art

In general, a brake system for vehicles includes, as a main constituent element, a hydraulic brake device configured to give a braking force in dependence on a pressure of a working fluid. JP-A-2004-338582 discloses one example of the hydraulic brake device configured to give a given braking force by a control. In the meantime, hybrid vehicles have received attention recently. In the hybrid vehicles, the braking force is generally obtained by a regenerative brake device. Thus, the hydraulic brake device that gives a given braking force by the control can be employed in a brake system for the hybrid vehicles.

SUMMARY

In a brake system that includes the hydraulic brake device described in JP-A-2004-338582 and the regenerative brake device, the braking force given by the hydraulic brake device is controlled in view of users' demands to prioritize energy regeneration, for instance. That is, the braking force given by the hydraulic brake device inevitably needs to be controlled in accordance with a braking force given by the regenerative brake device. The brake system that includes the regenerative brake device has much room for improvement in terms of practical utility. An aspect of the disclosure provides a brake system having high practical utility.

In one aspect of the disclosure, a brake system is configured such that a braking force by a hydraulic brake device is given to one of a front wheel and a rear wheel, a braking force by an electric brake device is given to the other of the front wheel and the rear wheel, and a braking force by a regenerative brake device is given to the front wheel or the rear wheel. Further, the brake system is configured such that a braking force which is obtained by excluding the braking force by the hydraulic brake device from an overall braking force required for a vehicle as a whole is controlled by controlling the electric brake device and the regenerative brake device and such that the braking force by the hydraulic brake device is given when the overall braking force required for the vehicle as a whole exceeds a threshold.

According to the brake system constructed as described above, the braking force by the electric brake device ("electric braking force") may be controlled with respect to a variation in the braking force by the regenerative brake device ("regenerative braking force") without controlling the braking force by the hydraulic brake device ("hydraulic braking force"). As a result, the required overall braking force becomes an appropriate value, whereby the brake system ensures excellent response. When the required overall braking force is equal to or smaller than the threshold, the regenerative braking force can be given in a comparatively large amount, so that the vehicles have high energy efficiency.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

Basic Form (1) A brake system mounted on a vehicle having a front wheel and a rear wheel each as a wheel, comprising:
  a brake operation member to be operated by a driver;
  a hydraulic brake device configured to give a braking force in accordance with an operation of the brake operation member to one of the front wheel and the rear wheel, by a pressure of a working fluid;
  an electric brake device configured to give a braking force generated by an electric actuator to the other of the front wheel and the rear wheel;
  a regenerative brake device configured to give a braking force utilizing electric power generation by rotation of the wheel to the front wheel or the rear wheel, and
  a controller configured to determine, based on the operation of the brake operation member, an insufficient braking force obtained by excluding the braking force given by the hydraulic brake device from a required overall braking force that is a braking force required for the vehicle as a whole and to control the electric brake device and the regenerative brake device so as to control the braking force given by each of the electric brake device and the regenerative brake device based on the insufficient braking force,
  wherein the brake system is configured such that the hydraulic brake device gives the braking force when the required overall braking force exceeds a threshold.

This form is a basic form of the claimable invention. The regenerative braking force varies depending upon a running speed of a vehicle, a charged state of a battery in which regenerated energy is stored as a quantity of electricity, and other factors. According to this form, the required overall braking force is controlled to become an appropriate value without controlling the hydraulic braking force, by controlling the electric braking force with respect to a variation in the regenerative braking force, specifically, by controlling the electric braking force such that a sum of the regenerative braking force and the electric braking force becomes equal to the insufficient braking force, for instance. It is consequently possible to effectuate the brake system that is excellent in response of the braking force given to the vehicle as a whole by relying on the control of the electric braking force that ensures good response. Further, in a time period in which the required overall braking force is equal to or smaller than the threshold such as in an initial period of the brake operation, the hydraulic braking force is not given. It is thus possible to give a relatively large regenerative braking force. As a result, the vehicle having high energy efficiency can be effectuated. It is noted that to "give the braking force" is synonymous with to "generate the braking force".

The term "braking force" means, in a narrow sense, a force to stop rotation of the wheel (hereinafter referred to as "wheel braking force" where appropriate). Because the force stops the vehicle that is running, the term "braking force" means, in a broad sense, a force to brake the vehicle (hereinafter referred to as "vehicle braking force" where appropriate). In an instance where changes of persons and cargo carried by the vehicle are not taken into consideration, the vehicle braking force may be interpreted as an equivalent to "vehicle deceleration". Thus, the technical significance of the claimable invention may be understood by replacing "braking force" with "deceleration" in the specification in most cases.

In this form, concrete structures of "hydraulic brake device", "electric brake device", and "regenerative brake device" are not limited, and known ordinary devices may be employed as the respective brake devices. As will be explained in detail, the hydraulic brake device may be configured to generate the hydraulic braking force depending directly on a force applied to the brake operation member by a driver, namely, depending directly on "brake operation force" (hereinafter simply referred to as "operation force"). Alternatively, the hydraulic brake device may include a hydraulic pressure source and may be configured to control a pressure of the working fluid supplied from the hydraulic pressure source so as to generate the hydraulic braking force depending on the controlled pressure of the working fluid, without depending directly on the brake operation force. In the former case, the hydraulic braking force may depend only on the brake operation force or may depend on the brake operation force assisted by a negative-pressure booster, the fluid pressure supplied from a high-pressure source, or the like. The "braking force in accordance with an operation of the brake operation member" may be the braking force in accordance with the brake operation force or may be the braking force in accordance with an amount of the operation of the brake operation member, i.e., "brake operation amount" (hereinafter simply referred to as "operation amount" where appropriate). That is, "operation of the brake operation member" is a concept that includes both of the brake operation force and the brake operation amount and further includes a speed of the operation of the brake operation member, i.e., "brake operation speed" (hereinafter simply referred to as "operation speed" where appropriate).

The brake system according to this form is configured such that the electric brake device gives the electric braking force to the rear wheel in an instance where the hydraulic brake device gives the hydraulic braking force to the front wheel and such that the electric brake device gives the electric braking force to the front wheel in an instance where the hydraulic brake device gives the hydraulic braking force to the rear wheel. In either instance, the regenerative brake device may be configured to give the regenerative braking force to the front wheel or the rear wheel. In other words, the regenerative brake device may give the regenerative braking force to the wheel to which the hydraulic brake device gives the hydraulic braking force or may give the regenerative braking force to the wheel to which the electric brake device gives the electric braking force.

The determination of "insufficient braking force" by the controller may be made based on the brake operation force, may be made based on the brake operation amount, or may be made based on both of the brake operation force and the brake operation amount. Moreover, the determination may be made based on the speed of the brake operation. The determination of the insufficient braking force may be made directly based on the brake operation in an instance where the hydraulic braking force is not controlled or in an instance where the hydraulic braking force is controlled based on a specific rule. Irrespective of whether the hydraulic braking force is controlled or not, the required overall braking force may be determined based on the brake operation, and the insufficient braking force may be determined by subtracting the hydraulic braking force to be generated from the determined required overall braking force.

A means for permitting the hydraulic brake device to give the braking force when the required overall braking force exceeds the threshold, in other words, a means for inhibiting the hydraulic brake device from giving the braking force when the required overall braking force is equal to or smaller than the threshold, may be attained by some mechanism of the hydraulic brake device configured to or not to generate the hydraulic braking force without executing any control, for instance. In an instance where the hydraulic brake device itself is controlled, the hydraulic brake device may be configured to or not to generate the hydraulic braking force by the control. The "threshold" may be set as a fixed value or may be set as a value that varies according to the situation at the time point such as the vehicle running speed or the charged state of the battery.

Interrelation of Braking Forces Given by Respective Brake Devices

In the following forms, there are added limitations as to interrelation of the hydraulic braking force generated by the hydraulic brake device, the electric braking force generated by the electric brake device, and the regenerative braking force generated by the regenerative brake device.

(11) The brake system according to the form (1), wherein the controller is configured to control the electric brake device and the regenerative brake device such that the braking force given by the regenerative brake device is maximized within a range of the insufficient braking force.

This form includes a form in which, when the insufficient braking force can be covered by the regenerative braking force, only the regenerative braking force is generated while being controlled and in which, when the insufficient braking force cannot be covered by the regenerative braking force, the regenerative braking force is generated to a maximum extent and the electric braking force makes up for the shortage while being controlled. The vehicle equipped with the thus constructed brake system ensures high energy efficiency.

(12) The brake system according to the form (1) or (11), wherein the threshold set for the required overall braking force is a maximum value of the braking force that can be given by the regenerative brake device.

In this form, the insufficient braking force is relatively large. For instance, in this form, the hydraulic braking force is not generated as long as the required overall braking force can be covered only by the regenerative braking force. In an extreme case, the hydraulic braking force is not generated within a range in which the regenerative brake device can give the regenerative braking force to its limits. When this form is combined with the above form in which the regenerative braking force is maximized within the range of the insufficient braking force, the regenerative braking force can be maximized, so that the vehicle ensures considerably high energy efficiency.

The "threshold" may be a fixed value corresponding to a maximum regenerative braking force set as a physical limit for the regenerative brake device or may be a maximum regenerative braking force at the time point that varies according to the situation at the time point such as the vehicle running speed or the charged state of the battery. In the former case, the threshold does not vary and it is accordingly not necessary to control timing of generation of the hydraulic braking force, so that the hydraulic brake device is simplified. Specifically, by employing a mechanism later explained, namely, a master cylinder equipped with an operation-force transmitting mechanism, the hydraulic braking force can be generated at appropriate timing without relying on the control.

Arrangement of Brake Devices

In the following forms, there are added limitations regarding to which wheel each of the hydraulic brake device, the electric brake device, and the regenerative brake device gives the braking force.

(21) The brake system according to any one of the forms (1)-(12), wherein the regenerative brake device is configured to give the braking force to the other of the front wheel and the rear wheel to which the electric brake device gives the braking force.

In this form, the electric brake device and the regenerative brake device respectively give the electric braking force and the regenerative braking force to one of the front wheel and the rear wheel, and the hydraulic brake device gives the hydraulic braking force to the other of the front wheel and the rear wheel. According to this form, in a state in which the hydraulic brake device is generating the hydraulic braking force, distribution of the required overall braking force between the front wheel and the rear wheel is kept equal to set distribution, in other words, a ratio between the braking force to be given to the front wheel and the braking force to be given to the rear wheel is kept at a set ratio, only by controlling the electric braking force and the regenerative braking force, without particularly controlling the hydraulic braking force that is being generated. (The above-indicated distribution will be hereinafter referred to as "braking-force distribution between the front wheel and the rear wheel" where appropriate.) This leads to a reduction in a change of the vehicle posture at the time of braking that arises from whether the regenerative braking force is being generated or not. In this regard, the braking-force distribution between the front wheel and the rear wheel may be fixedly set or may be set so as to change in accordance with the required overall braking force, for instance.

In this form, in a time period before the hydraulic braking force is generated, the braking force is given to only one of the front wheel and the rear wheel. Even either when the braking force is given only to the front wheel or when the braking force is given only to the rear wheel, a sufficient braking force is given. In terms of the stability of the vehicle posture, it is rather preferable to give the braking force only to the front wheel. In view of this, this form may be preferably configured such that the electric brake device and the regenerative brake device respectively give the electric braking force and the regenerative braking force to the front wheel and the hydraulic brake device gives the hydraulic braking force to the rear wheel.

In hybrid vehicles and electric vehicles, for example, the regenerative brake device is constituted such that a motor for driving the vehicles is used as an electric generator. In view of this, the regenerative brake device is generally configured to give the regenerative braking force to a drive wheel. Consequently, this form is equivalent to a form in which the electric brake device gives the electric braking force to the drive wheel.

(22) The brake system according to any one of the forms (1)-(12), wherein the regenerative brake device is configured to give the braking force to the one of the front wheel and the rear wheel to which the hydraulic brake device gives the braking force.

In this form, the electric brake device gives the electric braking force to one of the front wheel and the rear wheel, and the hydraulic brake device and the regenerative brake device respectively give the hydraulic braking force and the regenerative braking force to the other of the front wheel and the rear wheel. According to this form, when the hydraulic braking force is not given, namely, when the required overall braking force is small, it is possible to give the braking force to both of the front wheel and the rear wheel. Specifically, in an instance where the above-indicated maximum regenerative braking force is small or where the regenerative braking force is intentionally made small to some extent, the electric braking force can be given to the one of the front wheel and the rear wheel, and the regenerative braking force can be given to the other of the front wheel and the rear wheel. Consequently, the braking-force distribution between the front wheel and the rear wheel can be made close to appropriate distribution.

(23) The brake system according to any one of the forms (1)-(22), wherein the electric brake device is configured to give the braking force to the front wheel, and the hydraulic brake device is configured to give the braking force to the rear wheel.

According to this form, it is possible to give the electric braking force to the front wheel even in a state in which the required overall braking force is smaller than the threshold and the hydraulic braking force is not given to the rear wheel. In this form, the braking force for the front wheel can be at least ensured even in a state in which the required overall braking force is relatively small. This form is particularly effective when combined with the above-indicated form in which the regenerative braking force and the electric braking force are given to the same wheel. That is, in this form, the regenerative braking force and the electric braking force are given to the front wheel, and the hydraulic braking force is given to the rear wheel.

(24) The brake system according to any one of the forms (1)-(23), wherein the regenerative brake device is configured to give the braking force to a drive wheel which is the front wheel or the rear wheel.

According to this form, the regenerative brake device is constituted in the hybrid vehicles and the electric vehicles such that a motor for driving the vehicles is used as the electric generator.

Structure of Hydraulic Brake Device

In the following forms, there are added limitations as to the structure or configuration of the hydraulic brake device.

(31) The brake system according to any one of the forms (1)-(24), wherein the hydraulic brake device includes:
  a master cylinder to which the brake operation member is connected and which is configured to pressurize the working fluid by an operation force applied to the brake operation member;
  a brake cylinder which is provided on the wheel and to which is supplied the working fluid pressurized by the master cylinder or the working fluid whose pressure is adjusted in dependence on a pressure of the pressurized working fluid, the brake cylinder being operated by a pressure of the working fluid supplied thereto; and a friction member configured to be pushed, by an operation of the brake cylinder, onto the wheel or a rotor that rotates with the wheel and to generate the braking force utilizing a friction force.

In this form, there are added limitations as to a basic structure of known ordinary hydraulic brake devices.

(32) The brake system according to the form (31), wherein the master cylinder includes:

a pressurizing piston configured to move so as to pressurize the working fluid; and an operation-force transmitting mechanism configured to transmit the operation force as a force to move the pressurizing piston when a degree of the operation of the brake operation member exceeds a set degree.

In this form, when the required overall braking force exceeds the threshold, the pressurized working fluid is supplied from the master cylinder by an action of the operation-force transmitting mechanism. According to this form, the hydraulic brake device is configured to give the hydraulic braking force based on the function of the master cylinder when the required overall braking force exceeds the threshold, without particularly controlling the hydraulic brake device.

(33) The brake system according to the form (31) or (32), wherein the hydraulic brake device includes a simulator configured to allow the operation of the brake operation member that involves a movement of the brake operation member and to give, to the brake operation member, a counterforce with respect to the operation in a magnitude in accordance with an amount of the movement of the brake operation member.

The "simulator" may be also referred to as "stroke simulator". According to this form, the driver is given an appropriate brake operation feeling owing to the simulator. The simulator is particularly effective in the above-indicated form in which the master cylinder has the operation-force transmitting mechanism. That is, in an instance where the simulator is employed in the above-indicated form, the driver is given an appropriate operation feeling even when the hydraulic braking force is not actually generated. In this regard, the hydraulic brake device does not give the hydraulic braking force to both of the front wheel and the rear wheel, and it is accordingly unnecessary to provide two pressurizing chambers in the master cylinder. Thus, even if the simulator is disposed in the master cylinder, the master cylinder does not become large-sized, as compared with known ordinary two-system or tandem master cylinders having two pressurizing chambers. In this sense, it is preferable to dispose the simulator in the master cylinder.

(34) The brake system according to any one of the forms (31)-(33), wherein the hydraulic brake device includes one of: a pressure adjuster configured to adjust the pressure of the working fluid to be supplied to the brake cylinder to a pressure having a set ratio with respect to the pressure of the working fluid supplied from the master cylinder, and a booster configured to boost the operation force at a set ratio.

In this form, the hydraulic brake device is provided with a device for giving a hydraulic braking force larger than a hydraulic braking force that relies solely on the operation force. There may be employed, as the pressure adjuster, a device configured to adjust a pressure of the working fluid supplied from a high-pressure source to a pressure in accordance with a pressure of the working fluid supplied from the master cylinder and configured to supply the pressure-adjusted working fluid. Further, the so-called negative-pressure booster may be employed as the booster. The "set ratio" may be a fixedly set ratio or may be a ratio that changes depending upon the required overall braking force, the degree of the operation of the brake operation member, or the like. For permitting the pressure adjuster to give the hydraulic braking force larger than the hydraulic braking force that relies solely on the operation force, the set ratio should be larger than 1. In this case, the pressure adjuster may be referred to as a pressure-increase device.

(35) The brake system according to any one of the forms (1)-(24), wherein the hydraulic brake device includes a pressure adjuster configured to adjust a pressure of the working fluid supplied from a high-pressure source to a given pressure, the hydraulic brake device being configured to give the braking force in dependence on the working fluid whose pressure is adjusted by the pressure adjuster, and wherein the controller is configured to control the pressure adjuster based on the operation of the brake operation member so as to control the hydraulic brake device to give the braking force having a magnitude in accordance with the operation of the brake operation member.

There may be employed, as the hydraulic brake device of this form, a device that can give a given braking force by the control, without relying on the pressure of the working fluid supplied from the master cylinder. In an extreme sense, it is possible to employ a device that can give a given braking force by the control, irrespective of whether the hydraulic brake device is equipped with the master cylinder. In this form, the thus structured hydraulic brake device is employed.

Structure of Electric Brake Device

(41) The brake system according to any one of the forms (1)-(35), wherein the electric brake device includes a friction member configured to be pushed onto the wheel or a rotor that rotates with the wheel and to generate the braking force utilizing a friction force, and wherein the electric actuator of the electric brake device includes: an electric motor as a drive source; and a moving mechanism configured to move the friction member by a power of the electric motor.

In this form, there is added a limitation as to the structure of the electric brake device. In the electric brake device of this form, the electric braking force by the electric brake device can be controlled by controlling the electric current supplied to the electric motor as a drive source. It is consequently possible to establish a system having a good response.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
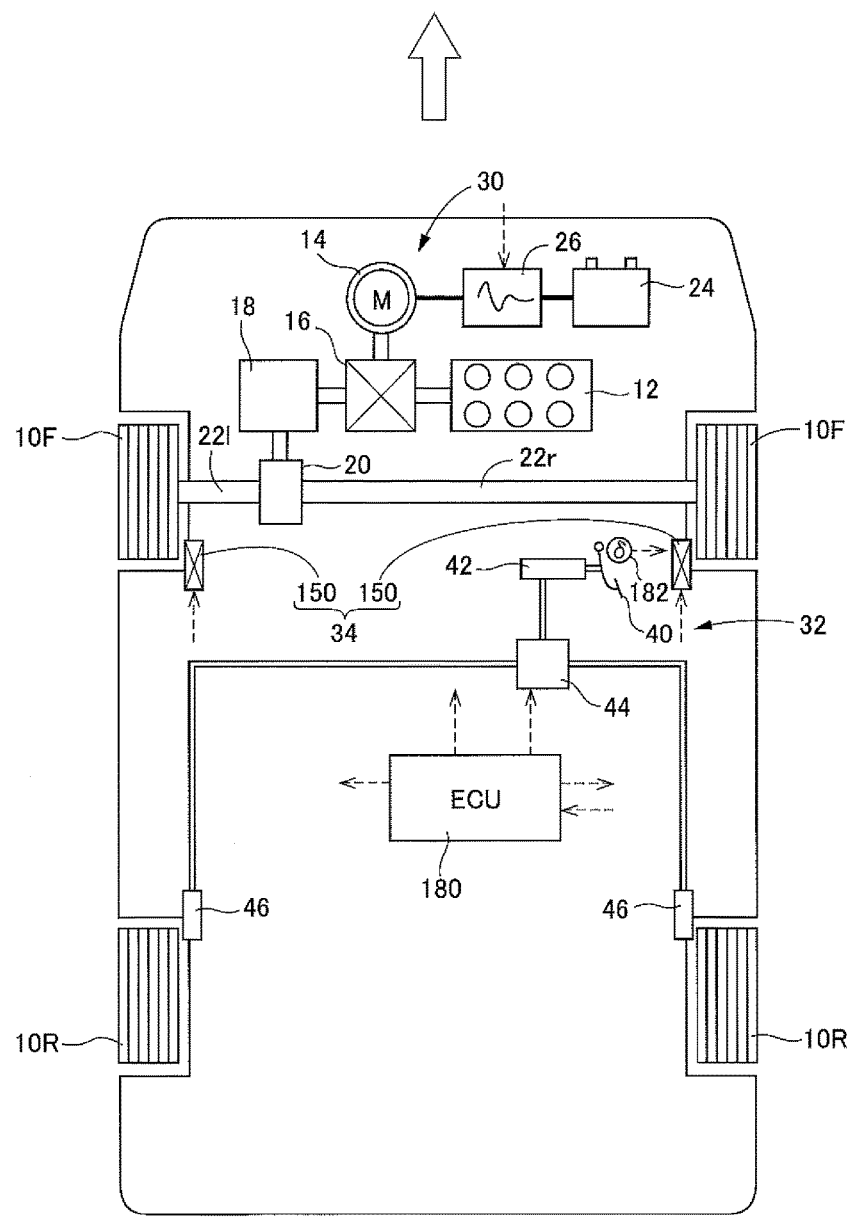
FIG. 1 is a conceptual view of a brake system according to a first embodiment including a regenerative brake device, a hydraulic brake device, and an electric brake device.

Referring to the drawings, there will be explained below in detail brake systems according to embodiments of the claimable invention and brake systems according to modifications of the embodiments. It is to be understood that the claimable invention is not limited to the details of the following embodiments and the forms described in Forms of the Invention, but may be changed and modified based on the knowledge of those skilled in the art.

First Embodiment

A. Outline of Vehicle Drive System and Brake System

As schematically shown in FIG. 1, a vehicle on which a brake system according to a first embodiment is installed is a hybrid vehicle having two front wheels 10F and two rear wheels 10R. The two front wheels 10 OF are drive wheels. A vehicle drive system installed on the vehicle includes an engine 12 and an electric motor 14 as two drive sources. The engine 12 and the electric motor 14 are coupled to each other via a power-distribution mechanism 16. The right and left front wheels 10F are driven by an output of the power-distribution mechanism 16 via a final reducer 18, a differential mechanism 20, and drive shafts 22*l*, 22*r*. The electric motor 14 is operated by controlling an inverter 26 disposed between the electric motor 14 and a battery 24.

As schematically shown in FIG. 1, the brake system installed on the vehicle includes (a) a regenerative brake device 30 configured to give a braking force to each of the two front wheels 10F, (b) a hydraulic brake device 32 configured to give a braking force to each of the two rear wheels 10R, and (c) an electric brake device 34 configured to give a braking force to each of the two front wheels 10F, independently of the braking force given by the regenerative brake device 30.

B. Structure of Regenerative Brake Device

In terms of hardware, the regenerative brake device 30 constitutes a part of the vehicle drive system. When the vehicle decelerates, the electric motor 14 is rotated by rotation of the front wheels 10F without receiving a power supply from the battery 24. The electric motor 14 generates electric power utilizing an electromotive force generated by its rotation, and the generated electric power is stored, via the inverter 26, in the battery 24 as a quantity of electricity (which may be also referred to as an electric quantity or an electric charge). That is, the electric motor 14 functions as an electric generator, so that the battery 24 is charged. The rotation of the front wheels 10F is decelerated, namely, the vehicle is decelerated, by an amount corresponding to energy that corresponds to the charged electric quantity. In the present vehicle, the regenerative brake device 30 is thus configured. The braking force given by the regenerative brake device 30 to the front wheels 10F (hereinafter referred to as "regenerative braking force" where appropriate) depends on the amount of the generated electric power, and the generated regenerative braking force is controlled by controlling the inverter 26. A detailed explanation of the regenerative brake device 30 is dispensed with because any regenerative brake device having a known ordinary structure can be employed as the regenerative brake device 30.

C. Structure of Hydraulic Brake Device i) Overall Structure

The hydraulic brake device 32 includes (a) a master cylinder 42 to which a brake pedal 40, as a brake operation member, is connected, (b) a brake actuator 44, as a pressure adjuster, to which the working fluid pressurized by the master cylinder 42 is supplied and which adjusts a pressure of the working fluid based on the pressure of the pressurized working fluid, and (c) two wheel brakes 46 respectively provided for the right and left rear wheels 10R and configured to decelerate rotation of the corresponding right and left rear wheels 10R by the pressure of the working fluid supplied from the brake actuator 44.

ii) Structure of Master Cylinder

Figure 2:
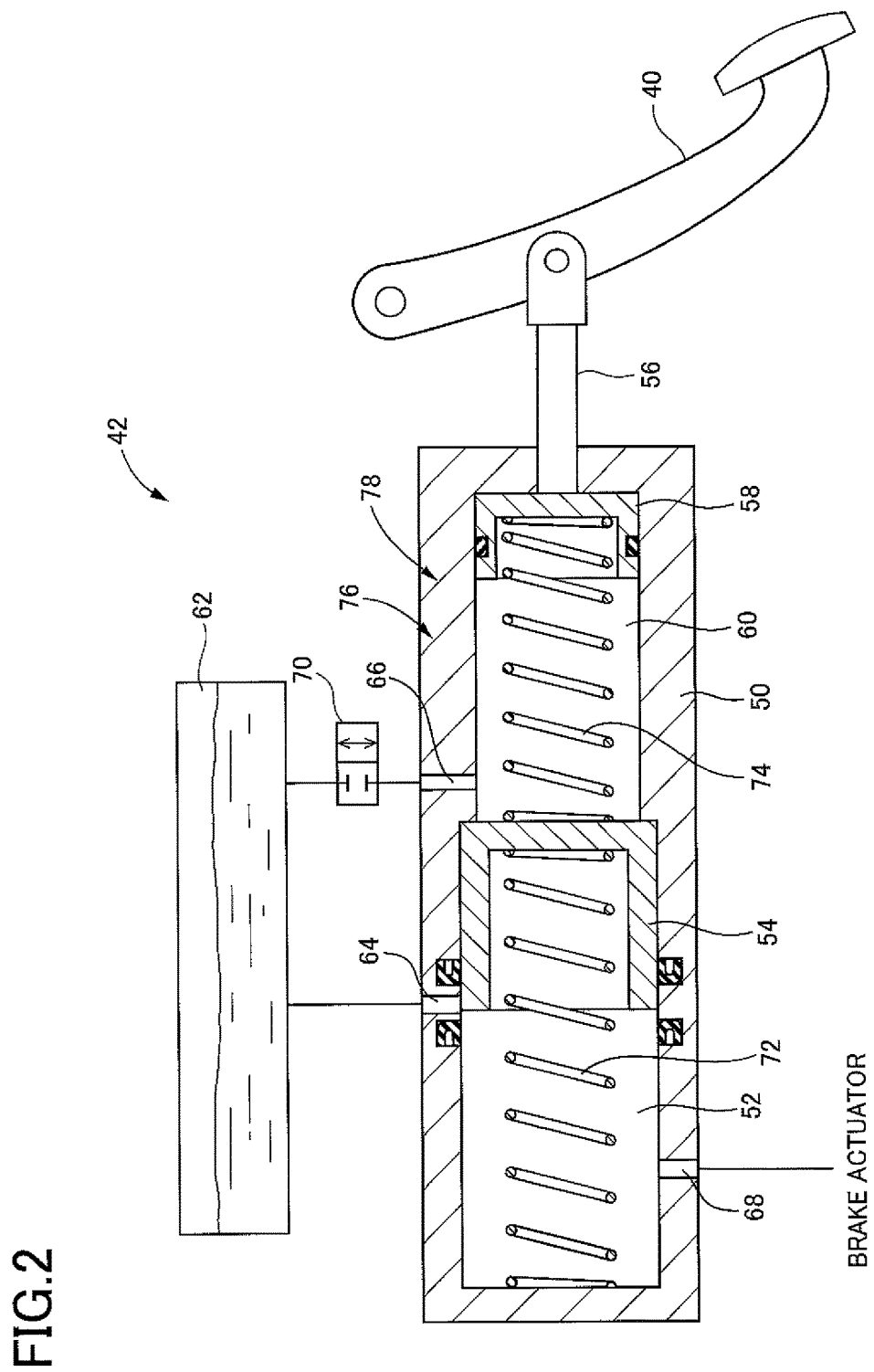
FIG. 2 is a schematic cross-sectional view of a master cylinder of the hydraulic brake device shown in FIG. 1.

As shown in FIG. 2, the master cylinder 42 includes (a) a housing 50, (b) a pressurizing piston 54 disposed in the housing 50 for pressurizing the working fluid in a pressurizing chamber 52, and (c) an input piston 58 disposed in the housing 50 so as to be connected to the brake pedal 40 via a link rod 56. The master cylinder 42 is disposed such that its left-hand side in FIG. 2 coincides with the front side of the vehicle, and the pressurizing chamber 52 is formed forward of the pressurizing piston 54. An inter-piston chamber 60, as another fluid chamber different from the pressurizing chamber 52, is formed at a position rearward of the pressurizing piston 54 and frontward of the input piston 58. That is, the inter-piston chamber 60 is defined between the pressurizing piston 54 and the input piston 58.

The housing 50 has a first port 64 through which a reservoir 62 that stores the working fluid and the pressurizing chamber 52 communicate with each other, a second port 66 through which the reservoir 62 and the inter-piston chamber 60 communicate with each other, and a third port 68 through which the working fluid is supplied from the pressurizing chamber 52. A normally-closed electromagnetic open/close valve 70 is provided in a fluid passage that connects the inter-piston chamber 60 and the reservoir 62. In a normal operating state of the vehicle, the electromagnetic open/close valve 70 is energized, so that the inter-piston chamber 60 and the reservoir 62 communicate with each other.

A first return spring 72 and a second return spring 74, each as a compression coil spring, are respectively provided in the pressurizing chamber 52 and the inter-piston chamber 60. The first return spring 72 and the second return spring 74 respectively bias the pressurizing piston 54 and the input piston 58 rearward. In the state shown in FIG. 2, the brake pedal 40 is not operated. In this state, the pressurizing piston 54 and the input piston 58 are located at respective rear-end positions in respective movement ranges by the biasing forces of the first return spring 72 and the second return spring 74.

When the driver depresses the brake pedal 40, an operation force is applied to the brake pedal 40. When the operation force overcomes the biasing forces of the first return spring 72 and the second return spring 74, the pressurizing piston 54 and the input piston 58 move forward. In the present master cylinder 42, however, the first return spring 72 exerts a relatively large set load (pre-load). Consequently, in a state in which the operation force is relatively small, only the input piston 58 moves forward while the pressurizing piston 54 is kept located at the rear-end position in its movement range. When the operation force exceeds the set load, the pressurizing piston 54 starts to move forward. The first port 64 is closed as a result of the forward movement of the pressurizing piston 54, and the working fluid in the pressurizing chamber 52 is pressurized by the pressurizing piston 54. The pressurized working fluid is supplied from the master cylinder 42 through the third port 68. That is, the master cylinder 42 pressurizes the working fluid in dependence on the operation force.

In view of the structure described above, it is construed that the master cylinder 42 includes a mechanism for permitting the operation force to act as a force to move the pressurizing piston when the degree of the operation of the brake pedal 40 exceeds the set degree, namely, an operation-force transmitting mechanism 76 which includes the first return spring 72 and the second return spring 74 and which employs a means for making the set load of the first return spring 72 relatively large. Further, the operation of the brake pedal 40 is allowed with the biasing force of the second return spring 74 given to the brake pedal 40 as a counter-force against the operation. The counterforce has a magnitude in accordance with an amount of the operation of the brake pedal 40, namely, the operation amount of the brake pedal 40. Thus, the master cylinder 42 has a simulator 78, namely, a stroke simulator, disposed therein, and the simulator 78 acts effectively in a state in which the operation force is relatively small and the pressurizing piston 54 does not move.

The set degree as to the degree of the operation of the brake pedal 40 will be later explained. In an instance where the hydraulic brake device 32 suffers from an electric failure, the electromagnetic open/close valve 70 is placed into a valve-closed state, and the simulator 78 fails to operate. In other words, the pressurizing piston 54 pressurizes the working fluid in the pressurizing chamber 52 in dependence on the operation force as if the input piston 58 and the pressurizing piston 54 work as a unit.

iii) Structure of Brake Actuator

Figure 3:
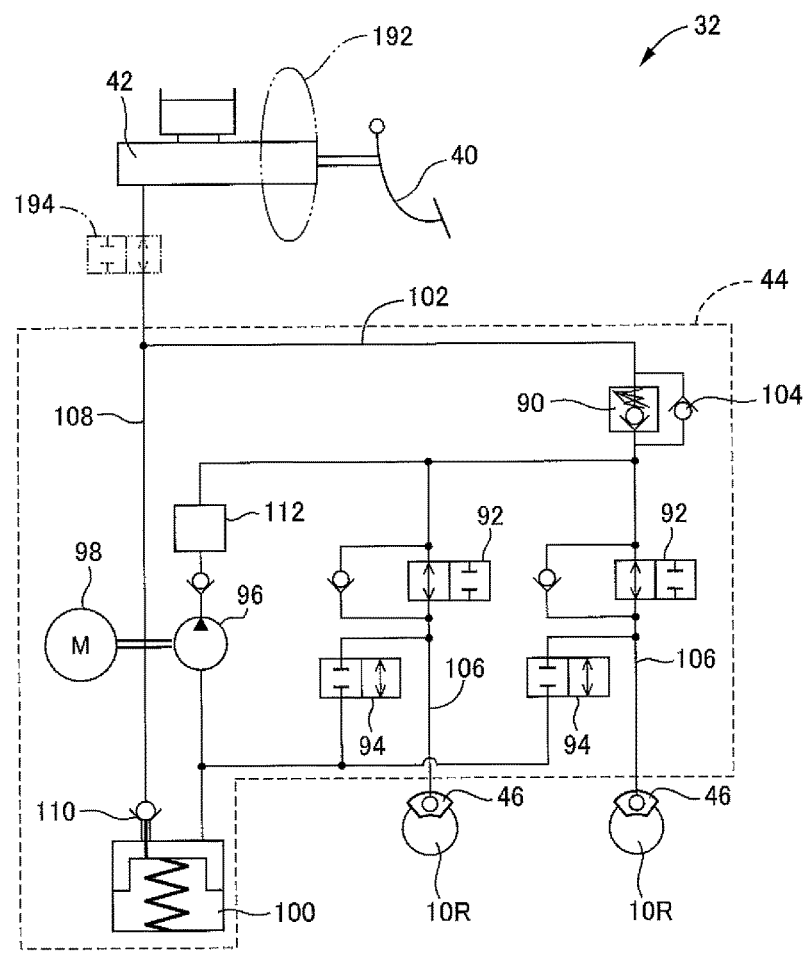
FIG. 3 is a hydraulic circuit diagram of a brake actuator of the hydraulic brake device shown in FIG. 1.

As shown in FIG. 3, the brake actuator 44 includes: an electromagnetic linear valve 90; two pressure-hold valves 92, each as a normally-opened electromagnetic open/close valve, corresponding to the two rear wheels 10R; two pressure-decrease valves 94, each as a normally-closed electromagnetic open/close valve, corresponding to the two rear wheels 10R; a pump 96 as a high-pressure source; an electric motor 98 configured to drive the pump 96; and a reservoir 100 that stores the working fluid. The pressure-hold valves 92 and the pressure-decrease valves 94 work in an anti-lock (anti-skid) operation or the like. Here, the explanation will be made on the understanding that these valves 92, 94 are not energized.

In a state in which the pump 96 is not activated, the working fluid supplied from the master cylinder 42 flows through a main flow passage 102 and two branched passages 106 that branch from the main flow passage 102 via a check valve 104, and reaches the wheel brakes 46 provided for the respective two rear wheels 10R. The electromagnetic linear valve 90 has a function of causing a pressure difference in the working fluid between its downstream side and its upstream side, depending upon the electric current supplied thereto. When the pump 96 is activated, the pump 96 pumps up the working fluid stored in the reservoir 100, so that the pressure of the working fluid flowing through the branched passages 106, namely, the pressure of the working fluid flowing on the downstream side of the electromagnetic linear valve 90, increases. When energized with a given amount of the electric current, the electromagnetic linear valve 90 adjusts the pressure of the working fluid flowing through the branched passages 106 to a pressure in accordance with the pressure of the working fluid supplied from the master cylinder 42. In other words, when the working fluid is supplied from the master cylinder 42, the electromagnetic linear valve 90 adjusts the pressure of the working fluid ejected from the pump 96 to a pressure having a set ratio with respect to the pressure of the working fluid supplied from the master cylinder 42. The set ratio is a ratio determined based on the electric current supplied to the electromagnetic linear valve 90.

When the electromagnetic linear valve 90 adjusts the pressure as described above, the working fluid flows out from the electromagnetic linear valve 90 toward the upstream side and returns to the reservoir 100 through a return passage 108. The reservoir 100 is provided with a special check valve 110 configured to open when the working fluid stored in the reservoir 100 is decreased. Owing to the action of the check valve 110, the working fluid is allowed to return to the reservoir 100. A buffer 112 is provided for suppressing a pressure variation of the working fluid ejected from the pump 96, specifically, a pulsing pressure variation.

While not shown, each rear wheel 10R is provided with a wheel-speed sensor. In the antilock operation or the like, the pressure-hold valves 92 and the pressure-decrease valves 94 are opened and closed based on detection results by the sensors.

iv) Structure of Wheel Brake

Figure 4A:
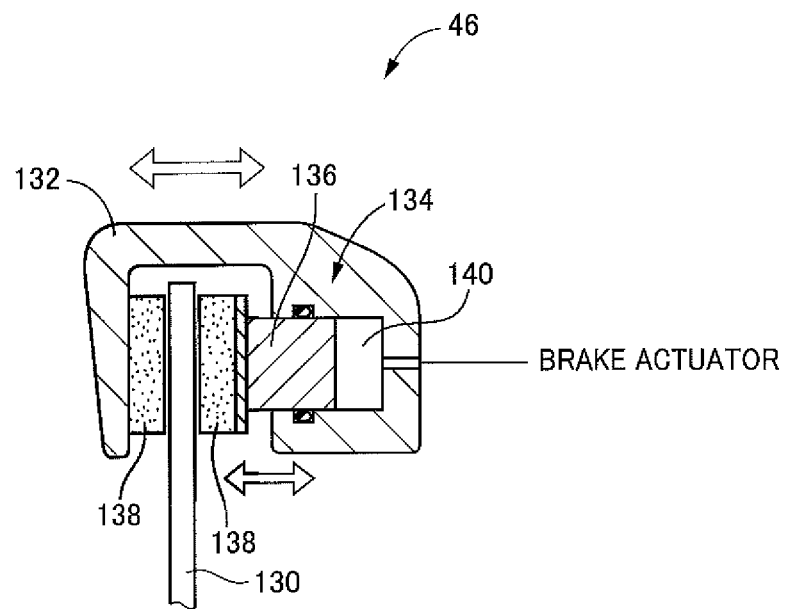
FIG. 4A is a schematic cross-sectional view of a wheel brake of the hydraulic brake device shown in FIG. 1

Each wheel brake 46 for stopping rotation of the corresponding rear wheel 10R is a disc brake device schematically shown in FIG. 4A. Each wheel brake 46 includes a disc rotor 130 as a rotor configured to rotate with the corresponding rear wheel 10R and a caliper 132 movably supported by a carrier that rotatably holds the rear wheel 10R. The caliper 132 incorporates a brake cylinder 134 whose housing is defined by a part of the caliper 132. A pair of brake pads 138, each as a friction member, is provided such that one brake pad 138 is attached to a distal end of a piston 136 of the brake cylinder 134 and the other brake pad 138 is attached to a portion of the caliper 132 located opposite to a portion thereof in which the brake cylinder 134 is incorporated. Thus, the two brake pads 138 are opposed to each other with the disc rotor 130 interposed therebetween.

The working fluid is supplied from the brake actuator 44 to a fluid chamber 140 of the brake cylinder 134, and the pressure of the supplied working fluid causes the brake pads 138 to nip the disc rotor 130 therebetween. That is, the brake cylinder 134 is operated to cause the brake pads 138 to be pushed onto the disc rotor 130. Thus, each wheel brake 46 generates, utilizing a friction force, a braking force to stop rotation of the corresponding rear wheel 10R, i.e., a braking force to brake the vehicle (hereinafter referred to as "hydraulic braking force" where appropriate). The hydraulic braking force has a magnitude in accordance with the pressure of the working fluid supplied from the brake actuator 44. The wheel brakes 46 have a known ordinary structure, and a detailed explanation thereof is dispensed with.

D. Structure of Electric Brake Device

Figure 4B:
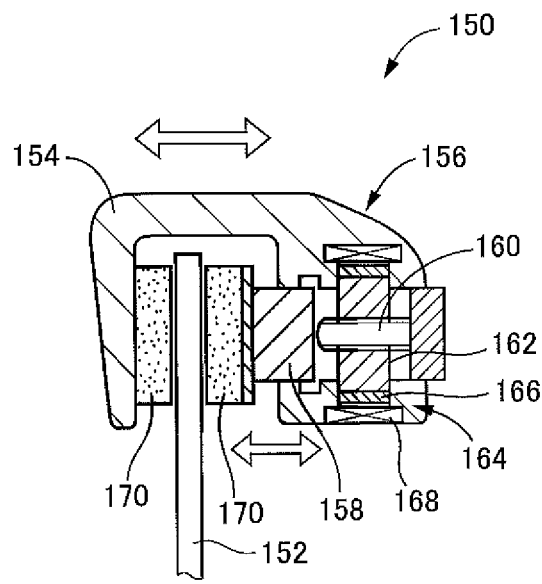
FIG. 4B is a schematic cross-sectional view of a wheel brake of the electric brake device shown in FIG. 1.

As shown in FIG. 1, the electric brake device 34 includes a pair of wheel brakes 150 for stopping rotation of the corresponding front wheels 10F. As shown in FIG. 4B, each wheel brake 150 is similar in structure to the wheel brakes 46 of the hydraulic brake device 32. Each wheel brake 46 operates by the pressure of the working fluid whereas each wheel brake 150 operates by a power of an electric motor.

Each wheel brake 150 includes a disc rotor 152, as a rotor, configured to rotate with the corresponding front wheel 10F and a caliper 154 movably supported by a carrier that rotatably holds the corresponding front wheel 10F. The caliper 154 incorporates an electric actuator 156. The electric actuator 156 includes (a) a plunger 158 held by the caliper 154 so as to be advanceable and retractable relative to the disc rotor 152, (b) a threaded rod 160 which is held by the caliper 154 so as to be unrotatable and so as to be advanceable and retractable relative to the disc rotor 152 and which has an external thread on its outer circumference, (c) a nut 162 which has an internal thread that is held in engagement with the external thread of the threaded rod 160 and which is held by the caliper 154 so as to be rotatable and so as not to be advanceable and retractable relative to the disc rotor 152, and (d) an electric motor 164 configured to rotate the nut 162. The electric motor 164 includes: magnets 166 attached to an outer circumference of the nut 162; and coils 168 held by the caliper 154.

A pair of brake pads 170, each as a friction member, is provided such that one brake pad 170 is attached to a distal end of the plunger 158 of the electric actuator 156 and the other brake pad 170 is attached to a portion of the caliper 154 located opposite to a portion thereof in which the electric actuator 156 is disposed. Thus, the two brake pads 170 are opposed to each other with the disc rotor 152 interposed therebetween. The electric actuator 156 is configured such that the brake pads 170 are pushed onto the disc rotor 152 by rotation of the electric motor 164 as a drive source. In other words, the electric actuator 156 includes a mechanism constituted by the plunger 158, the threaded rod 160, and the nut 162, namely, a moving mechanism for moving the friction members by the power of the electric motor 164.

Thus, each wheel brake 150 of the electric brake device 34 generates, utilizing a friction force, a braking force to stop rotation of the corresponding front wheel 10F, namely, a braking force to brake the vehicle (hereinafter referred to as "electric braking force" where appropriate). The electric braking force has a magnitude in accordance with the electric current supplied to the electric motor 164. The wheel brakes 150 have a known ordinary structure, and a detailed explanation thereof is dispensed with.

E. Outline of Control of Braking Forces i) Controller

The control of the present brake system, namely, the control of a braking force F, is executed by an electronic control unit (ECU) 180, as a controller, shown in FIG. 1. (Respective braking forces are collectively referred to as "braking force F" where appropriate.) The ECU 180 includes a computer and drivers, each as a drive circuit, for components to be controlled. Specifically, the ECU 180 controls the inverter 26 that constitutes the regenerative brake device 30, the electromagnetic linear valve 90 of the brake actuator 44 that constitutes the hydraulic brake device 32, and the electric motors 164 of the wheel brakes 150 that constitute the electric brake device 34, thereby controlling a regenerative braking force $F_{RG}$, a hydraulic braking force $F_{HY}$, and an electric braking force $F_{EM}$. Consequently, an overall braking force $F_{SUM}$, which is the braking force F to be given to the vehicle as a whole, is controlled. In the present brake system, only one ECU 180 controls the respective braking forces F. A plurality of ECUs may respectively control a plurality of braking forces F while performing communication with one another.

As shown in FIG. 1, the brake pedal 40 is provided with an operation-force sensor 182 for detecting the operation force δ of the brake pedal 40. The ECU 180 obtains, based on the detected operation force δ, a required overall braking force $F_{SUM}*$ which is a braking force required for the vehicle as a whole, namely, a sum of a required regenerative braking force $F_{RG}*$, a required hydraulic braking force $F_{HY}*$, and a required electric braking force $F_{EM}*$. That is, the operation force δ may be considered as a parameter indicative of the required overall braking force $F_{SUM}*$.

ii) Generation and Control of Hydraulic Braking Force

The hydraulic brake device 32 is configured to generate the hydraulic braking force $F_{HY}$ based on the structure of the master cylinder 42 when the degree of the operation of the brake pedal 40 becomes equal to the set degree. In the regenerative brake device 30, there is set a limit to the quantity of electricity per unit time that can be regenerated, due to the structure of the regenerative brake device 30. Consequently, the regenerative brake device 30 can only generate, at the maximum, the regenerative braking force $F_{RG}$ corresponding to the limit. Here, this regenerative braking force $F_{RG}$ is defined as a rated regenerative braking force (nominal regenerative braking force) $F_{RG-LIM}$. In the master cylinder 42, when the operation force δ that makes the required overall braking force $F_{SUM}*$ equal to the rated regenerative braking force $F_{RG-LIM}$ is applied to the brake pedal 40, the pressurizing piston 54 moves forward, and the pressurized working fluid is supplied to the brake actuator 44. In other words, the hydraulic brake device 32 is configured to generate, based on the structure of the master cylinder 42, the hydraulic braking force $F_{HY}$ when the operation force δ, which is the degree of the operation of the brake pedal 40, exceeds a set load $δ_{TH}$ which corresponds to the set degree. As explained above, the operation force δ may be considered as the parameter indicative of the required overall braking force $F_{SUM}*$. Thus, the hydraulic brake device 32 generates the hydraulic braking force $F_{HY}$ when the required overall braking force $F_{SUM}*$ exceeds a threshold $F_{SUM}*_{TH}$ that is a threshold set for the required overall braking force $F_{SUM}*$.

When the working fluid is supplied from the master cylinder 42 to the brake actuator 44, in other words, on condition that the required overall braking force $F_{SUM}*$ exceeds the threshold $F_{SUM}*_{TH}$, the ECU 180 supplies an electric current I to the electromagnetic linear valve 90 of the brake actuator 44 and adjusts the pressure of the working fluid to be supplied to the wheel brakes 46. The electric current I is set such that the hydraulic braking force $F_{HY}$ to be generated is equal to a braking force obtained by distributing, to the rear wheels 10R, the required overall braking force $F_{SUM}*$ according to set braking-force distribution between the front wheels and the rear wheels. That is, the electric current I is supplied to the electromagnetic linear valve 90 such that the hydraulic braking force $F_{HY}$ set for the hydraulic brake device 32 is generated based on the required overall braking force $F_{SUM}*$, irrespective of the magnitude of the required hydraulic braking force $F_{HY}*$ and the required electric braking force $F_{EM}*$. In other words, the hydraulic brake device 32 generates the hydraulic braking force $F_{HY}$ based on appropriate braking-force distribution between the front wheels and the rear wheels without being particularly controlled.

iii) Control of Regenerative Braking Force and Electric Braking Force

The ECU 180 determines, as an insufficient braking force $F_{REM}*$, a braking force obtained by subtracting the hydraulic braking force $F_{HY}$ from the required overall braking force $F_{SUM}*$. The ECU 180 controls the regenerative brake device 30 and the electric brake device 34 such that a sum of the regenerative braking force $F_{RG}$ and the electric braking force $F_{EM}$ is equal to the insufficient braking force $F_{REM}*$. In this regard, in an instance where the required overall braking force $F_{SUM}*$ is not larger than the threshold $F_{SUM}*_{TH}$, the insufficient braking force $F_{REM}*$ is equal to the required overall braking force $F_{SUM}*$.

Depending upon the charged amount of the battery 24, the vehicle running speed and so on, the regenerative braking force $F_{RG}$ that can be generated by the regenerative brake device 30 at that time becomes maximum though the maximum value is not larger than the rated regenerative braking force $F_{RG-LIM}$ explained above. Here, the maximum value of the regenerative braking force $F_{RG}$ is defined as a maximum regenerative braking force $F_{RG-MAX}$. The maximum regenerative braking force $F_{RG-MAX}$ varies depending upon situations, unlike the rated regenerative braking force $F_{RG-LIM}$. The ECU 180 obtains the maximum regenerative braking force $F_{RG-MAX}$ according to a predetermined method though the method is not explained here in detail. In an instance where the insufficient braking force $F_{REM}*$ is not larger than the maximum regenerative braking force $F_{RG-MAX}$, the ECU 180 controls only the regenerative brake device 30 such that the regenerative braking force $F_{RG}$ becomes equal to the insufficient braking force $F_{REM}*$. In an instance where the insufficient braking force $F_{REM}*$ exceeds the maximum regenerative braking force $F_{RG-MAX}$, on the other hand, the ECU 180 controls the regenerative brake device 30 such that the regenerative braking force $F_{RG}$ becomes equal to the maximum regenerative braking force $F_{RG-MAX}$ and controls the electric brake device 34 such that the electric braking force $F_{EM}$ becomes equal to a braking force obtained by subtracting the maximum regenerative braking force $F_{RG-MAX}$ from the insufficient braking force $F_{REM}*$. In other words, the regenerative brake device 30 and the electric brake device 34 are controlled such that the regenerative braking force $F_{RG}$ is maximized within the range of the insufficient braking force $F_{REM}*$.

iv) Changes of Braking Forces Generated by Control

Figure 5A:
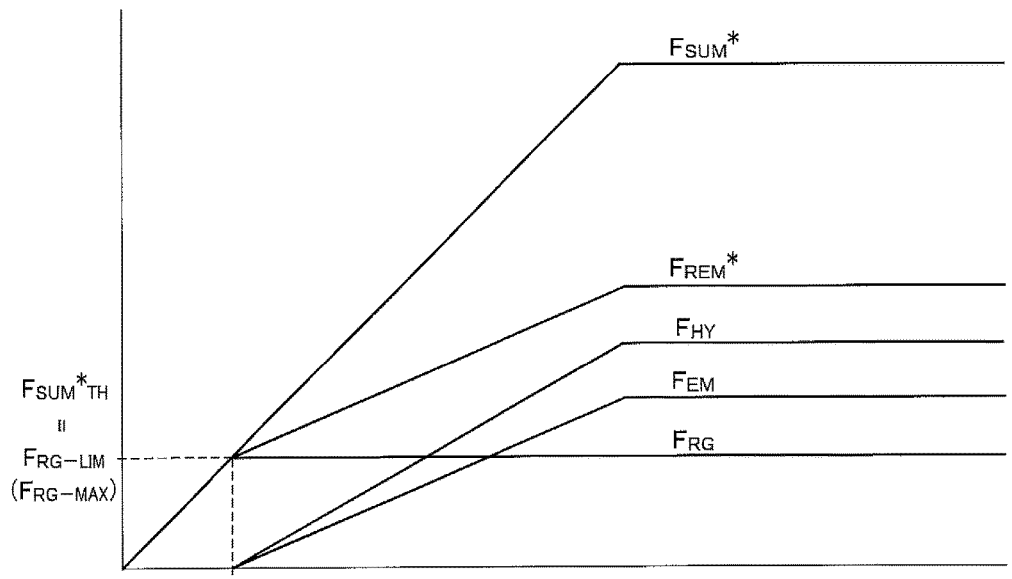
FIGS. 5A and 5B are graphs each showing changes in respective braking forces generated in the brake system of the first embodiment.
Figure 5B:
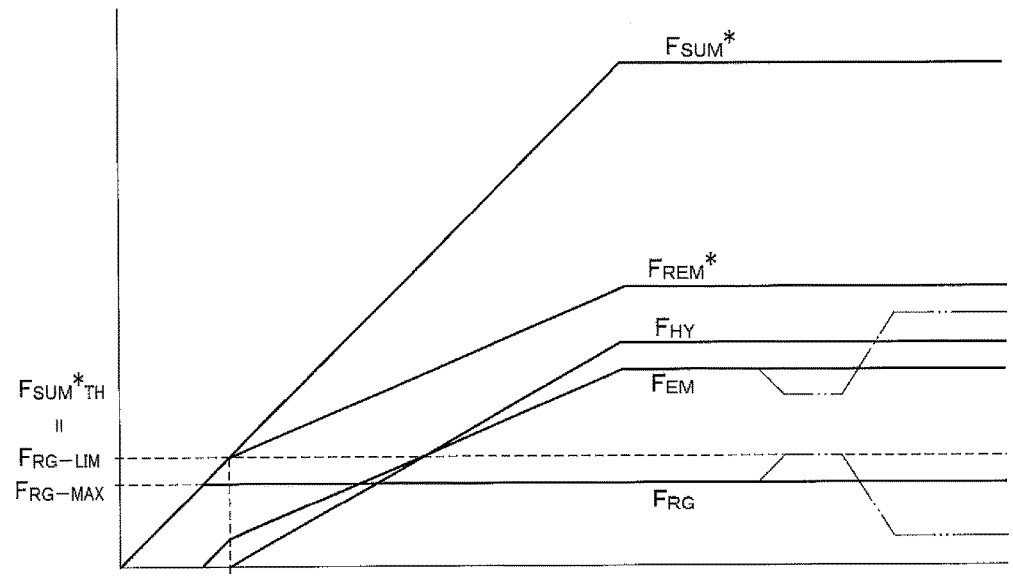

The braking forces F generated by the control described above change as shown in FIGS. 5A and 5B. Specifically, FIGS. 5A and 5B show changes of the braking forces on the assumption that the brake pedal 40 is depressed at a normal operation speed and is held at a position at which the brake pedal 40 is operated to a certain extent. FIG. 5A shows changes of the braking forces F in a state in which the maximum regenerative braking force $F_{RG-MAX}$ is equal to the rated regenerative braking force $F_{RG-LIM}$. FIG. 5B shows changes of the braking forces F in a state in which the maximum regenerative braking force $F_{RG-MAX}$ is smaller than the rated regenerative braking force $F_{RG-LIM}$.

FIG. 5A will be explained. As the operation of the brake pedal 40 progresses, namely, with an increase in the operation force δ, the required overall braking force $F_{SUM}*$ is increased. As explained above, the hydraulic braking force $F_{HY}$ is generated when the required overall braking force $F_{SUM}*$ exceeds the threshold $F_{SUM}*_{TH}$. In the present brake system, the threshold $F_{SUM}*_{TH}$ is set to be equal to the rated regenerative braking force $F_{RG-LIM}$. Consequently, in the initial period of the brake operation, namely, within the range in which the required overall braking force $F_{SUM}*$ can be covered by the regenerative braking force $F_{RG}$, the regenerative braking force $F_{RG}$ is controlled to be equal to the required overall braking force $F_{SUM}*$.

After the hydraulic braking force $F_{HY}$ has been generated, the hydraulic braking force $F_{HY}$ is increased, according to preset settings, with an increase in the operation force δ, namely, with an increase in the required overall braking force $F_{SUM}*$. When the required overall braking force $F_{SUM}*$ exceeds the threshold $F_{SUM}*_{TH}$, namely, after the hydraulic braking force $F_{HY}$ has been generated, the electric braking force $F_{EM}$ is also generated to make up for the shortage of the overall braking force $F_{SUM}$. As the required overall braking force $F_{SUM}*$ is increased, the electric braking force $F_{EM}$ is increased with an increase in the hydraulic braking force $F_{HY}$.

FIG. 5B will be explained. The maximum regenerative braking force $F_{RG-MAX}$ is smaller than the rated regenerative braking force $F_{RG-LIM}$. Consequently, before the required overall braking force $F_{SUM}*$ becomes equal to the rated regenerative braking force $F_{RG-LIM}$, it becomes impossible to cover a remaining residual braking force $F_{REM}$ only by the regenerative braking force $F_{RG}$, namely, it becomes impossible to cover the required overall braking force $F_{SUM}*$ only by the regenerative braking force $F_{RG}$. To compensate for the shortage, the electric braking force $F_{EM}$ is generated before the hydraulic braking force $F_{HY}$ is generated, unlike the state of FIG. 5A.

In an instance where the maximum regenerative braking force $F_{RG-MAX}$ varies due to some reason and the regenerative braking force $F_{RG}$ to be generated accordingly varies, as indicated by the long dashed double-short dashed line in FIG. 5B, the electric braking force $F_{EM}$ is changed to cancel the variation. Specifically, in an instance where the maximum regenerative braking force $F_{RG-MAX}$ becomes large and the regenerative braking force $F_{RG}$ can be largely generated, the regenerative braking force $F_{RG}$ is accordingly increased, and the electric braking force $F_{EM}$ is decreased by an amount corresponding to the increase in the regenerative braking force $F_{RG}$. On the other hand, in an instance where the maximum regenerative braking force $F_{RG-MAX}$ becomes small and the regenerative braking force $F_{RG}$ will be inevitably decreased, the regenerative braking force $F_{RG}$ is accordingly decreased, and the electric braking force $F_{EM}$ is increased by an amount corresponding to the decrease in the regenerative braking force $F_{RG}$.

v) Flow of Control Process

Figure 6:
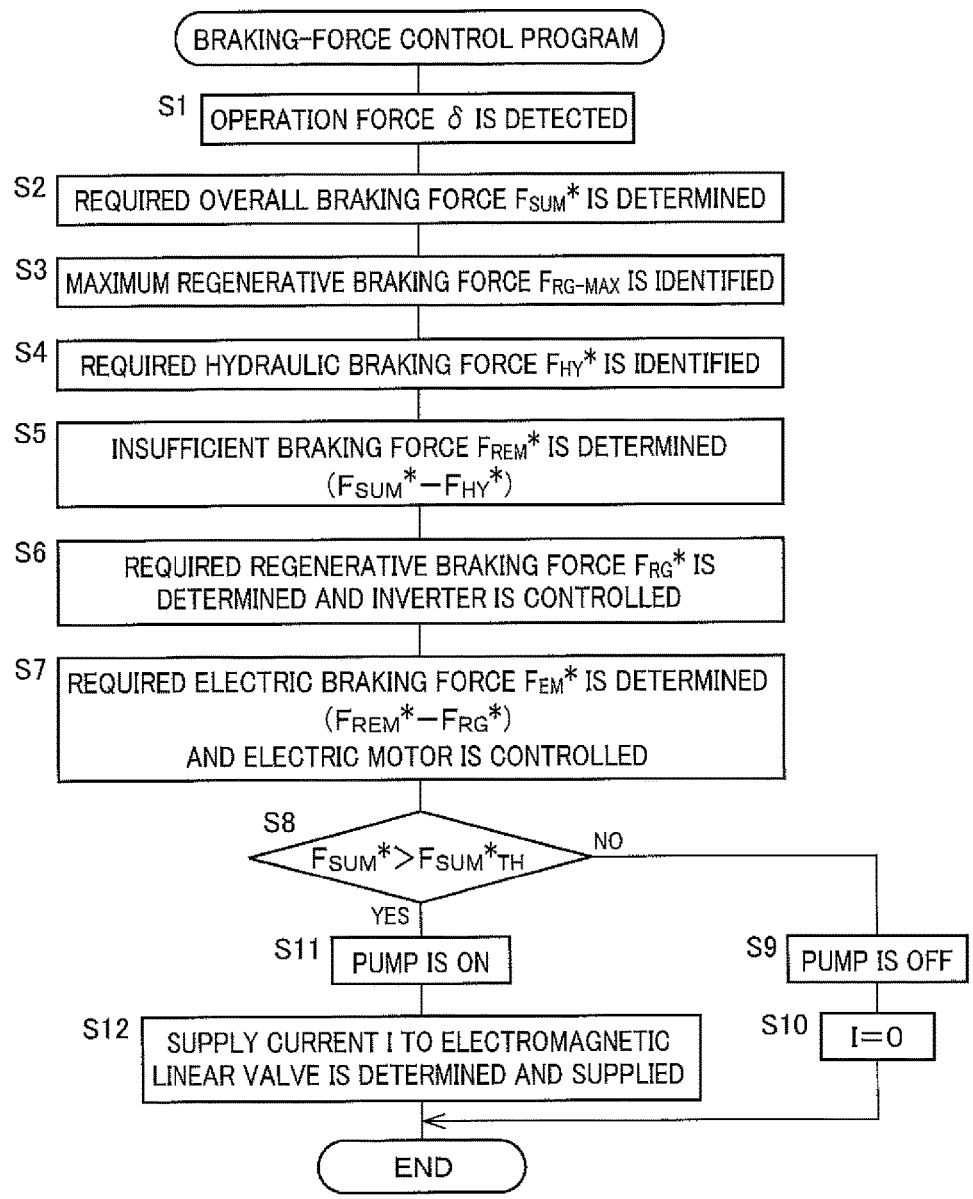
FIG. 6 is a flow chart showing a braking-force control program executed in an electronic control unit of the brake system of the first embodiment.

The braking forces F are controlled such that the ECU 180 repeatedly executes a braking-force control program shown by a flow chart of FIG. 6 at a short time pitch from several to several tens of μsecs, for instance. The control process will be briefly explained according to the program.

In the process according to the braking-force control program, the operation force δ applied to the brake pedal 40 is detected at Step 1 based on the detected value by the operation-force sensor 182. ("Step 1" is hereinafter abbreviated as "S1" and other steps are similarly abbreviated.) At S2, the required overall braking force $F_{SUM}*$ is determined according to a predetermined rule based on the detected operation force δ. At S3, the maximum regenerative braking force $F_{RG-MAX}$ is identified based on the charged state of the battery 24 and other factors. At S4, the required hydraulic braking force $F_{HY}*$ is identified according to predetermined characteristics of the hydraulic braking force to be generated based on the operation force δ or the required overall braking force $F_{SUM}^*$.

Subsequently, at S5, the insufficient braking force $F_{REM}^*$ is determined by subtracting the required hydraulic braking force $F_{HY}^*$ from the required overall braking force $F_{SUM}^*$. At S6, referring to the identified maximum regenerative braking force $F_{RG\text{-}MAX}$, the required regenerative braking force $F_{RG}^*$ is determined based on the insufficient braking force $F_{REM}^*$, such that the regenerative braking force $F_{RG}$, which is as large as possible, can be obtained, and the inverter 26 is controlled based on the determined required regenerative braking force $F_{RG}^*$. At S7, the required electric braking force $F_{EM}^*$ is determined by subtracting the required regenerative braking force $F_{RG}^*$ from the insufficient braking force $F_{REM}^*$, and the electric motors 164 of the wheel brakes 150 in the electric brake device 34 are controlled based on the required electric braking force $F_{EM}^*$.

It is subsequently determined at S8 whether the required overall braking force $F_{SUM}^*$ is in excess of the threshold $F_{SUM}^*{}_{TH}$. When the required overall braking force $F_{SUM}^*$ is equal to or smaller than the threshold $F_{SUM}^*{}_{TH}$, the hydraulic brake device 32 does not generate the hydraulic braking force $F_{HY}$. In this instance, the pump 96 of the brake actuator 44 is ceased to be activated or the non-activated state of the pump 96 is maintained at S9, and the electric current is stopped from being supplied to the electromagnetic linear valve 90 or the non-supply state of the electric current is maintained at S10. On the other hand, when the required overall braking force $F_{SUM}^*$ is in excess of the threshold $F_{SUM}^*{}_{TH}$, the pump 96 is started to be activated or the activated state of the pump 96 is maintained at S11. Subsequently, at S12, the supply current I to the electromagnetic linear valve 90 is determined based on the identified required hydraulic braking force $F_{HY}$, and the determined supply current I is supplied to the electromagnetic linear valve 90.

F. Advantages of Brake System

In the present brake system, the electric braking force $F_{EM}$ is controlled with respect to a variation in the regenerative braking force $F_{RG}$, so that the overall braking force $F_{SUM}$ becomes an appropriate value. Thus, the present brake system has good response. In the present brake system, the regenerative braking force $F_{RG}$ and the electric braking force $F_{EM}$ are given to the front wheels 10F, and the hydraulic braking force $F_{HY}$ is given to the rear wheels 10R. It is consequently possible to maintain appropriate braking-force distribution between the front wheels and the rear wheels with good response in a state in which the hydraulic braking force $F_{HY}$ is generated. Further, when the required overall braking force $F_{SUM}^*$ is equal to or smaller than the threshold $F_{SUM}^*{}_{TH}$, the hydraulic braking force $F_{HY}$ is not given, and the regenerative braking force $F_{RG}$ is maximized within the range of the insufficient braking force $F_{REM}^*$, so that the present brake system ensures high energy efficiency.

In the present brake system, the braking force F is given only to the front wheels 10F in a state in which the hydraulic braking force is not generated. This is advantageous in terms of the stability of the vehicle posture, as compared with an arrangement in which the braking force F is given only to the rear wheels 10R in that state. The brake system is configured to give the regenerative braking force $F_{RG}$ to the front wheels 10F as the drive wheels, and the electric motor for driving the vehicle is utilized as the electric generator. Thus, the present brake system is suitable for known ordinary hybrid vehicles, electric vehicles, for instance.

Second Embodiment

Figure 7:
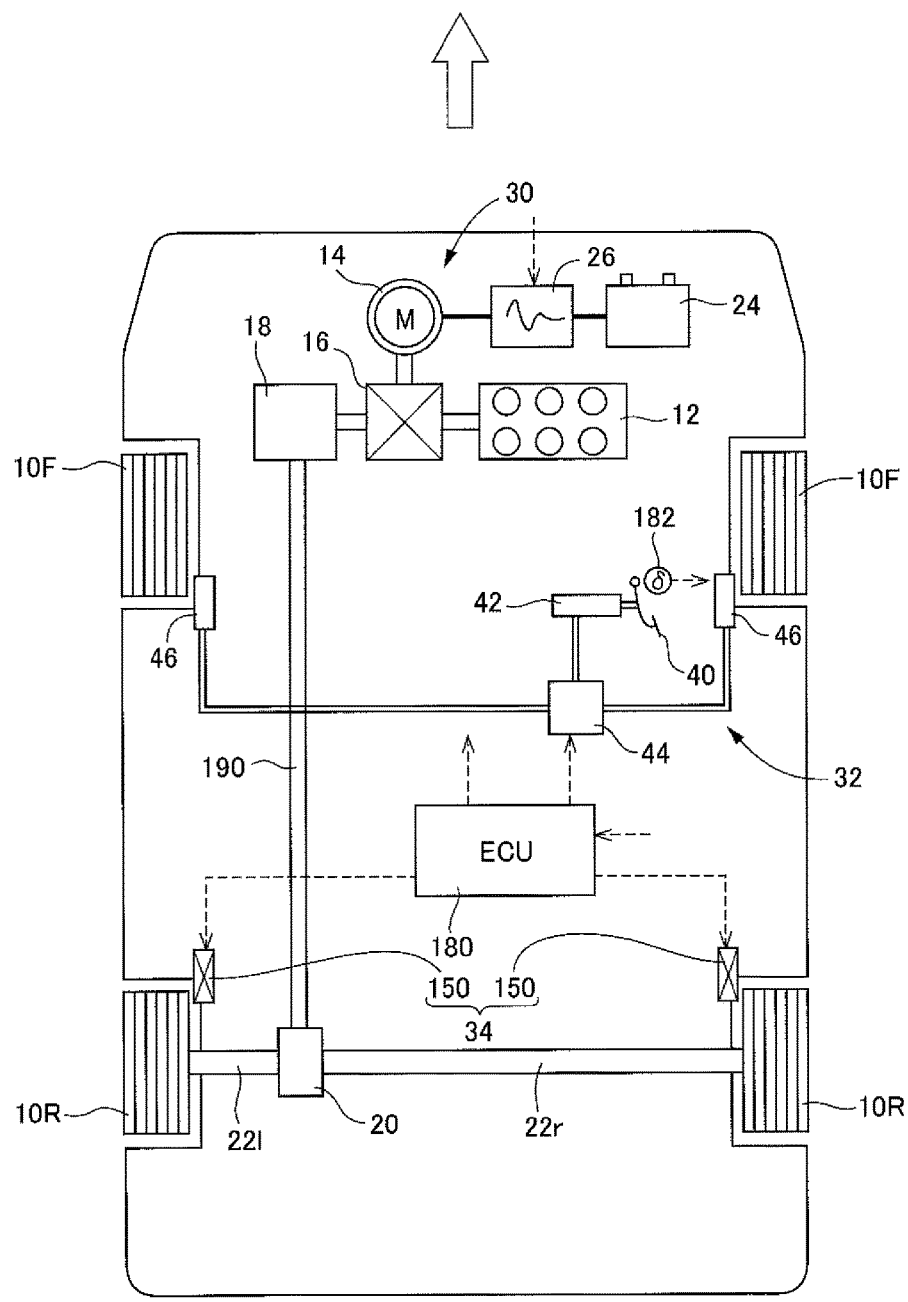
FIG. 7 is a conceptual view of a brake system according to a second embodiment including the regenerative brake device, the hydraulic brake device, and the electric brake device.

A. Structure of Vehicle Drive System and Brake System According to Second Embodiment As schematically shown in FIG. 7, a vehicle on which a brake system according to a second embodiment is installed has two rear wheels 10R as the drive wheels. The vehicle drive system and the brake system of the second embodiment are mostly identical in structure with those of the vehicle on which the brake system of the first embodiment is installed. In view of this, the same reference numerals as used in the first embodiment are used to identify the functionally corresponding components of the second embodiment, and a detailed explanation thereof is dispensed with. The two rear wheels 10R are the drive wheels in the vehicle drive system of the second embodiment, and a propeller shaft 190 that extends in the front-rear direction of the vehicle connects the final reducer 18 and the differential mechanism 20.

In the brake system according to the second embodiment, the regenerative brake device 30 and the electric brake device 34 are configured to respectively give the regenerative braking force and the electric braking force to each of the two rear wheels 10R as the drive wheels, and the hydraulic brake device 32 is configured to give the hydraulic braking force to each of the two front wheels, as schematically shown in FIG. 7.

B. Control of Braking Forces

The braking forces are controlled in the brake system of the second embodiment in a manner similar to that in the brake system of the first embodiment, and its explanation is dispensed with. The braking forces F to be generated by the control are similar to those shown in FIG. 6. In the brake system of the second embodiment, however, because the hydraulic braking force $F_{HY}$ is given to the front wheels 10F and the regenerative braking force $F_{RG}$ and the electric braking force $F_{EM}$ are given to the rear wheels 10R, the insufficient braking force $F_{REM}^*$ in FIG. 6 is a braking force required for the rear wheels 10R. In a time period before the required overall braking force $F_{SUM}^*$ exceeds the threshold $F_{SUM}^*{}_{TH}$, the hydraulic braking force $F_{HY}$ is not given to the front wheels 10F.

C. Advantages of Brake System

In the brake system of the second embodiment, the overall braking force $F_{SUM}$ becomes an appropriate value by controlling the electric braking force $F_{EM}$ with respect to a variation in the regenerative braking force $F_{RG}$, as in the brake system of the first embodiment. Thus, the brake system has good response. Further, it is possible to maintain appropriate braking-force distribution between the front wheels and the rear wheels with good response in a state in which the hydraulic braking force is generated. The regenerative braking force $F_{RG}$ is maximized within the range of the insufficient braking force $F_{REM}^*$, so that the brake system ensures high energy efficiency. In the present brake system, the regenerative braking force $F_{RG}$ is given to the rear wheels 10R as the drive wheels, and the electric motor for driving the vehicle is utilized as the electric generator. Thus, the present brake system is suitable for known ordinary hybrid vehicles and electric vehicles, for instance.

Third Embodiment

Figure 8:
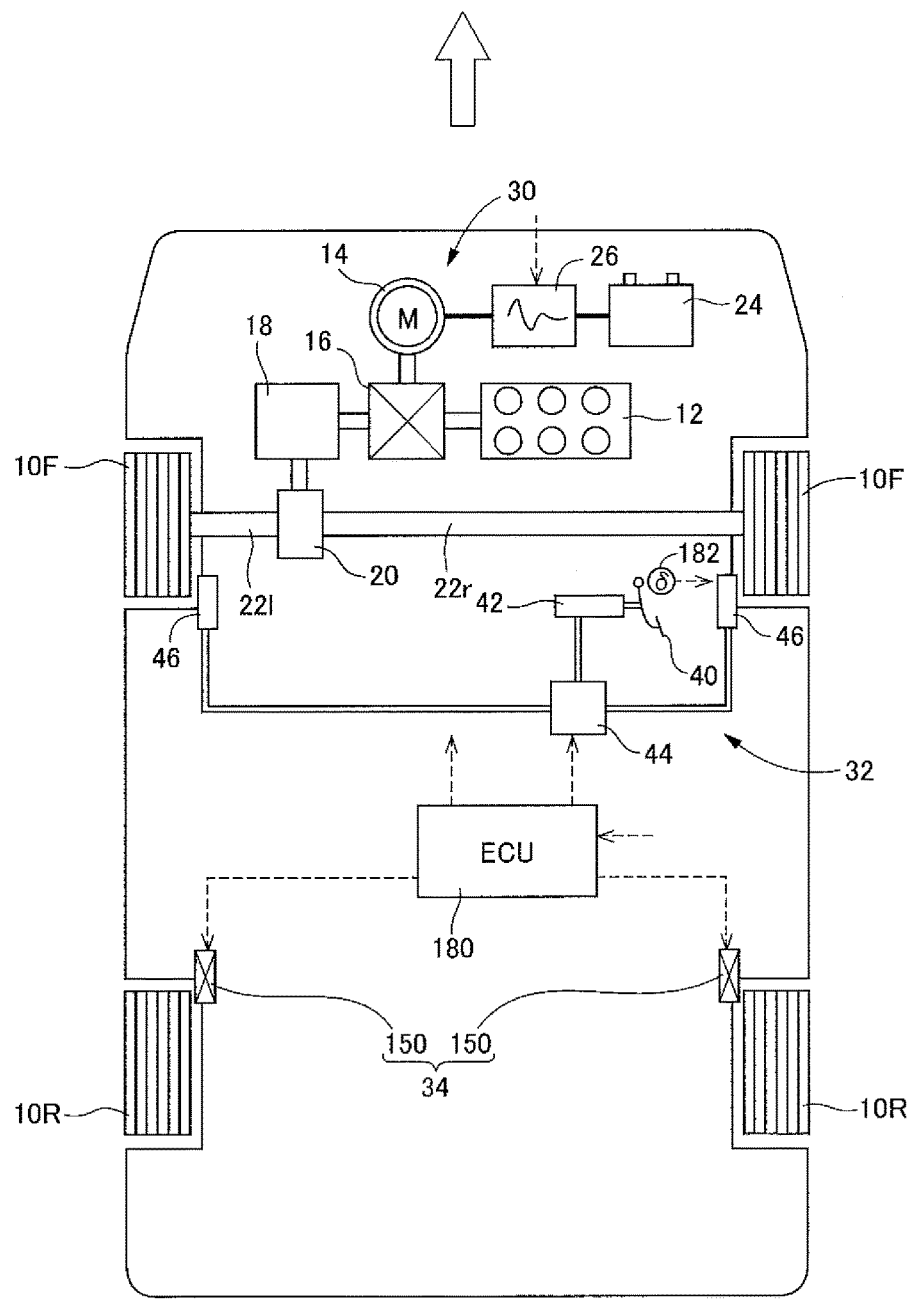
FIG. 8 is a conceptual view of a brake system according to a third embodiment including the regenerative brake device, the hydraulic brake device, and the electric brake device.

A. Structure of Vehicle Drive System and Brake System according to Third Embodiment As schematically shown in FIG. 8, a vehicle on which a brake system according to a third embodiment is installed has two front wheels 10F as the drive wheels. The vehicle drive system and the brake system of the third embodiment are mostly identical in construction with those of the vehicle on which the brake system of the first embodiment is installed. In view of this, the same reference numerals as used in the first embodiment are used to identify the functionally corresponding components of the third embodiments, and a detailed explanation thereof is dispensed with.

In the brake system of the third embodiment, the regenerative brake device 30 and the hydraulic brake device 32 are configured to respectively give the regenerative braking force and the hydraulic braking force to each of the two front wheels 10F as the drive wheels, and the electric brake device 34 is configured to give the electric braking force to each of the two rear wheels 10R, as schematically shown in FIG. 8.

B. Control of Braking Forces

The braking forces are controlled in the brake system of the third embodiment in a manner similar to that in the brake system of the first embodiment, and its explanation is dispensed with. The braking forces F to be generated are similar to those shown in FIG. 6. In the brake system of the third embodiment, however, the regenerative braking force $F_{RG}$ and the hydraulic braking force $F_{HY}$ are given to the front wheels 10F, and the electric braking force $F_{EM}$ is given to the rear wheels 10R. Consequently, the insufficient braking force $F_{REM}^*$ in FIG. 6 is distributed to the front wheels 10F and the rear wheels 10R even in a state in which the required overall braking force $F_{SUM}^*$ is equal to or smaller than the threshold $F_{SUM}^*{}_{TH}$ and the hydraulic braking force $F_{HY}$ is not generated, such as when the maximum regenerative braking force $F_{RG-MAX}$ is small.

C. Advantages of Brake System

In the brake system of the third embodiment, the overall braking force $F_{SUM}$ becomes an appropriate value by controlling the electric braking force $F_{EM}$ with respect to a variation in the regenerative braking force $F_{RG}$, as in the brake system of the first embodiment. Thus, the brake system has good response. Further, the regenerative braking force $F_{RG}$ is maximized within the range of the insufficient braking force $F_{REM}^*$, so that the brake system ensures high energy efficiency. In the present brake system, the regenerative braking force $F_{RG}$ is given to the front wheels 10F as the drive wheels, and the electric motor for driving the vehicle is utilized as the electric generator. Thus, the present brake system is suitable for known ordinary hybrid vehicles and electric vehicles, for instance.

When the required overall braking force $F_{SUM}^*$ is equal to or smaller than the threshold $F_{SUM}^*{}_{TH}$, the regenerative braking force $F_{RG}$ to be given may be decreased to a certain extent, and the electric braking force $F_{EM}$ to be given may be increased by an amount corresponding to the decrease in the regenerative braking force $F_{RG}$. As a result, the braking-force distribution between the front wheels and the rear wheels can be made close to ideal one even in a state in which the hydraulic braking force $F_{HY}$ is not generated. That is, even when the required overall braking force $F_{SUM}^*$ is small, it is possible to maintain the stability of the vehicle posture by giving the braking forces F to both of the front wheels 10F and the rear wheels 10R.

Modified Embodiments

In the brake systems according to the illustrated first through third embodiments, the hydraulic brake device 32 includes the brake actuator 44, as the pressure adjuster, configured to adjust the pressure of the working fluid to the pressure according to the pressure of the working fluid supplied from the master cylinder 42. Further, the pressure-adjusted working fluid is supplied to the wheel brakes 46, so as to generate the hydraulic braking force larger than the hydraulic braking force that depends solely on the operation force applied to the brake pedal 40. Instead, a negative-pressure booster 192 indicated by the long dashed double-short dashed line in FIG. 3 may be provided in the master cylinder 42, without providing the brake actuator 44. The negative-pressure booster 192 is a booster for boosting the operation force applied to the brake pedal 40 at a set ratio. Also in the hydraulic brake device having the booster, it is possible not to generate the hydraulic braking force when the required overall braking force is equal to or smaller than the threshold. Thus, the brake system of the claimable invention is applicable to the system having such a hydraulic brake device.

The hydraulic brake device 32 shown in FIG. 3 may be replaced with another hydraulic brake device in which an open-close valve 194 indicated by the long dashed double-short dashed line in FIG. 3 is provided between the main flow passage 102 and the master cylinder 42 and in which the electromagnetic linear valve 90 and the return passage 108 are not provided. In a normal condition (no-failure condition), the open-close valve 194 is closed, and the supply current to the pressure-hold valves 92 and the pressure-decrease valves 94 is duty-controlled, for instance, whereby the hydraulic braking force is controlled. In the thus constructed hydraulic brake device, the brake actuator functions as a pressure adjuster configured to adjust, to a given pressure, the pressure of the working fluid from the pump 96 as the high-pressure source, by mainly controlling the supply current to the pressure-hold valves 92 and the pressure-decrease valves 94, without depending on the pressure of the working fluid supplied from the master cylinder 42. In an instance where the thus constructed hydraulic brake device is employed, the hydraulic braking force is controlled by starting to control the supply current to the pressure-hold valves 92 and the pressure-decrease valves 94 at timing of generation of the hydraulic braking force, namely, at a time point when the required overall braking force determined based on the operation force exceeds the threshold of the required overall braking force.

In the brake systems according to the illustrated first through third embodiments, the threshold of the required overall braking force is a fixed value set as a limit of the rated regenerative braking force, namely, set as the regeneration limit in terms of the structure of the hydraulic brake device 32. In an instance where the vehicle employs a hydraulic brake device that can control timing of generation of the hydraulic braking force, the threshold may be set as a variable value like the maximum regenerative braking force. In other words, the threshold may be set to a given value as long as the threshold does not exceed the rated regenerative braking force, irrespective of whether the threshold is fixed or variable.

In the brake systems according to the illustrated first through third embodiments, the regenerative braking force and the electric braking force are controlled such that, in a state in which the hydraulic braking force is not generated, the regenerative braking force is maximized within the range of the insufficient braking force. The regenerative braking force and the electric braking force may be generated according to given distribution within the range of the insufficient braking force.

What is claimed is:

1. A brake system mounted on a vehicle having a front wheel and a rear wheel each as a wheel, comprising:
a brake operation member to be operated by a driver;
a hydraulic brake device configured to give a hydraulic braking force in accordance with an operation of the brake operation member to one of the front wheel and the rear wheel, the hydraulic braking force being a braking force generated by a pressure of a working fluid;
an electric brake device configured to give an electric braking force which is a braking force generated by an electric actuator to the other of the front wheel and the rear wheel;
a regenerative brake device configured to give a regenerative braking force which is a braking force utilizing electric power generation by rotation of the wheel to the front wheel or the rear wheel, and
a controller configured to determine, based on the operation of the brake operation member, an insufficient braking force obtained by excluding the hydraulic braking force given by the hydraulic brake device from a required overall braking force that is a braking force required for the vehicle as a whole and to control the electric brake device and the regenerative brake device so as to control, based on the insufficient braking force, the electric braking force given by the electric brake device and the regenerative braking force given by the regenerative brake device,
wherein the brake system is configured such that the hydraulic brake device gives the hydraulic braking force when the required overall braking force exceeds a threshold.

2. The brake system according to claim 1, wherein the controller is configured to control the electric brake device and the regenerative brake device such that the regenerative braking force given by the regenerative brake device is maximized within a range of the insufficient braking force.

3. The brake system according to claim 1, wherein the threshold set for the required overall braking force is a maximum value of the regenerative braking force that can be given by the regenerative brake device.

4. The brake system according to claim 1, wherein the regenerative brake device is configured to give the regenerative braking force to the other of the front wheel and the rear wheel to which the electric brake device gives the electric braking force.

5. The brake system according to claim 1, wherein the regenerative brake device is configured to give the regenerative braking force to the one of the front wheel and the rear wheel to which the hydraulic brake device gives the hydraulic braking force.

6. The brake system according to claim 1, wherein the electric brake device is configured to give the electric braking force to the front wheel, and the hydraulic brake device is configured to give the hydraulic braking force to the rear wheel.

7. The brake system according to claim 1, wherein the regenerative brake device is configured to give the regenerative braking force to a drive wheel which is the front wheel or the rear wheel.

8. The brake system according to claim 1, wherein the hydraulic brake device includes:
a master cylinder to which the brake operation member is connected and which is configured to pressurize the working fluid by an operation force applied to the brake operation member;
a brake cylinder which is provided on the wheel and to which is supplied the working fluid pressurized by the master cylinder or the working fluid whose pressure is adjusted in dependence on a pressure of the pressurized working fluid, the brake cylinder being operated by a pressure of the working fluid supplied thereto; and
a friction member configured to be pushed, by an operation of the brake cylinder, onto the wheel or a rotor that rotates with the wheel and to generate the hydraulic braking force utilizing a friction force.

9. The brake system according to claim 8, wherein the master cylinder includes:
a pressurizing piston configured to move so as to pressurize the working fluid; and
an operation-force transmitting mechanism configured to transmit the operation force as a force to move the pressurizing piston when a degree of the operation of the brake operation member exceeds a set degree.

10. The brake system according to claim 8, wherein the hydraulic brake device includes a simulator configured to allow the operation of the brake operation member that involves a movement of the brake operation member and to give, to the brake operation member, a counterforce with respect to the operation in a magnitude in accordance with an amount of the movement of the brake operation member.

11. The brake system according to claim 8, wherein the hydraulic brake device includes one of: a pressure adjuster configured to adjust the pressure of the working fluid to be supplied to the brake cylinder to a pressure having a set ratio with respect to the pressure of the working fluid supplied from the master cylinder; and a booster configured to boost the operation force at a set ratio.

12. The brake system according to claim 1,
wherein the hydraulic brake device includes a pressure adjuster configured to adjust a pressure of the working fluid supplied from a high-pressure source to a given pressure, the hydraulic brake device being configured to give the hydraulic braking force in dependence on the working fluid whose pressure is adjusted by the pressure adjuster, and
wherein the controller is configured to control the pressure adjuster based on the operation of the brake operation member so as to control the hydraulic brake device to give the hydraulic braking force having a magnitude in accordance with the operation of the brake operation member.

13. The brake system according to claim 1,
wherein the electric brake device includes a friction member configured to be pushed onto the wheel or a rotor that rotates with the wheel and to generate the electric braking force utilizing a friction force, and
wherein the electric actuator of the electric brake device includes: an electric motor as a drive source; and a moving mechanism configured to move the friction member by a power of the electric motor.

* * * * *